United States Patent
Krzywon

(10) Patent No.: US 11,702,943 B2
(45) Date of Patent: Jul. 18, 2023

(54) PROPELLER CONTROL UNIT VALIDATION

(71) Applicant: PRATT & WHITNEY CANADA CORP., Longueuil (CA)

(72) Inventor: Jagoda Krzywon, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 125 days.

(21) Appl. No.: 17/164,076

(22) Filed: Feb. 1, 2021

(65) Prior Publication Data
US 2022/0243600 A1 Aug. 4, 2022

(51) Int. Cl.
*B64C 11/30* (2006.01)
*F01D 7/00* (2006.01)
*G08B 21/18* (2006.01)

(52) U.S. Cl.
CPC .............. *F01D 7/00* (2013.01); *B64C 11/301* (2013.01); *B64C 11/305* (2013.01); *G08B 21/182* (2013.01); *F05D 2240/20* (2013.01); *F05D 2260/70* (2013.01)

(58) Field of Classification Search
CPC .. B64C 11/30–11/44; F01D 7/00; F01D 7/02; G08B 21/182; F05D 2260/20; F05D 2260/70
See application file for complete search history.

(56) References Cited

U.S. PATENT DOCUMENTS

| | | | |
|---|---|---|---|
| 5,284,418 A * | 2/1994 | Moriya | B64C 11/44 701/99 |
| 5,997,250 A | 12/1999 | Carter, Jr. et al. | |
| 6,059,528 A * | 5/2000 | Danielson | B64C 11/40 416/61 |
| 7,873,445 B2 * | 1/2011 | Schaeffer | B64C 29/0033 701/16 |
| 9,476,312 B2 * | 10/2016 | Foskey | F01D 7/00 |
| 10,487,682 B2 * | 11/2019 | Duke | B64C 11/06 |
| 10,994,836 B2 * | 5/2021 | Shiosaki | B64D 35/00 |
| 11,143,200 B2 * | 10/2021 | Albrecht | F15B 20/007 |

(Continued)

FOREIGN PATENT DOCUMENTS

| | | |
|---|---|---|
| EP | 3705396 | 9/2020 |
| EP | 3741666 | 11/2020 |

(Continued)

*Primary Examiner* — Justin D Seabe
*Assistant Examiner* — Sang K Kim
(74) *Attorney, Agent, or Firm* — Norton Rose Fulbright Canada LLP

(57) ABSTRACT

Methods and systems for validating a propeller control unit associated with a propeller having blades are provided. Actuation of a control valve of the propeller control unit is commanded to alter a pitch angle of the blades. One of an actual pitch angle of the blades and an actual rotational speed of the propeller is determined after a predetermined time delay has elapsed. The one of the actual pitch angle of the blades and the actual rotational speed of the propeller is compared to a corresponding one of a pitch angle threshold and a rotational speed threshold, the pitch angle threshold and the rotational speed threshold based on a commanded pitch angle. A warning signal is issued in response to determining one of the actual pitch angle failing to meet the pitch angle threshold and the actual rotational speed failing to meet the rotational speed threshold.

16 Claims, 4 Drawing Sheets

(56) References Cited

U.S. PATENT DOCUMENTS

| | | |
|---|---|---|
| 2016/0207609 A1 | 7/2016 | Belmonte et al. |
| 2017/0066523 A1 | 3/2017 | Miszkiewicz |
| 2017/0361919 A1 | 12/2017 | Waddleton |
| 2018/0043991 A1 | 2/2018 | Tajan et al. |
| 2019/0031319 A1 | 1/2019 | Calkins et al. |
| 2019/0092453 A1 | 3/2019 | Hoemke et al. |
| 2020/0283124 A1* | 9/2020 | Zakucia ................ B64C 11/303 |
| 2021/0009252 A1* | 1/2021 | Forte .................... B64C 11/305 |
| 2021/0347472 A1* | 11/2021 | Karem ................... B64C 11/46 |

FOREIGN PATENT DOCUMENTS

| | | |
|---|---|---|
| EP | 3284666 | 10/2021 |
| EP | 3626627 | 3/2022 |

* cited by examiner

PROPELLER CONTROL UNIT VALIDATION

TECHNICAL FIELD

The application relates generally to aircraft engines, and more particularly to propeller controllers of propeller-driving aircraft engines.

BACKGROUND OF THE ART

In aircraft engines, continuous inlet air is compressed, mixed with fuel in an inflammable proportion, and exposed to an ignition source to ignite the mixture which then continues to burn to produce combustion products. The combustion of the air-fuel mixture can be used to power various mechanical components, which in turn can be used to produce thrust or other mechanical force.

Certain aircraft engines are mechanically coupled to propellers, which produce thrust to propel the aircraft. A propeller control unit provided for use with the propeller serves to effect control of the operation of the propeller, including to control pitch angles of the blades of the propeller, and to control the rotational speed of the propeller. The propeller control unit is actuated by way of a hydraulic fluid, which is supplied under pressure by a pump and distributed at a variable pressure to achieve target values of propeller speed and blade pitch angle.

While existing propeller control systems are suitable for their purposes, improvements remain desirable.

SUMMARY

In one aspect, there is provided a method for validating a propeller control unit associated with a propeller having blades. The method comprises: commanding, by a controller, actuation of a control valve of the propeller control unit to alter a pitch angle of the blades; determining, at the controller, one of an actual pitch angle of the blades and an actual rotational speed of the propeller after a predetermined time delay has elapsed from the commanding of the actuation of the control valve; comparing, at the controller, the one of the actual pitch angle of the blades and the actual rotational speed of the propeller to a corresponding one of a pitch angle threshold and a rotational speed threshold, the pitch angle threshold and the rotational speed threshold based on a commanded pitch angle; and issuing, by the controller, a warning signal in response to determining one of the actual pitch angle failing to meet the pitch angle threshold and the actual rotational speed failing to meet the rotational speed threshold In another aspect, there is provided a system for validating a propeller control unit associated with a propeller having blades. The system comprises a processing unit, and a non-transitory computer-readable medium having stored thereon instructions. The instructions are executable by the processing unit to cause the system to perform: commanding actuation of a control valve of the propeller control unit to alter a pitch angle of the blades; determining one of an actual pitch angle of the blades and an actual rotational speed of the propeller after a predetermined time delay has elapsed from the commanding of the actuation of the control valve; comparing the one of the actual pitch angle of the blades and the actual rotational speed of the propeller to a corresponding one of a pitch angle threshold and a rotational speed threshold, the pitch angle threshold and the rotational speed threshold based on a commanded pitch angle; and issuing a warning signal in response to determining one of the actual pitch angle failing to meet the pitch angle threshold and the actual rotational speed failing to meet the rotational speed threshold Features of the systems, devices, and methods described herein may be used in various combinations, in accordance with the embodiments described herein. In particular, any of the features described herein may be used alone, together in any suitable combination, and/or in a variety of arrangements, as appropriate.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
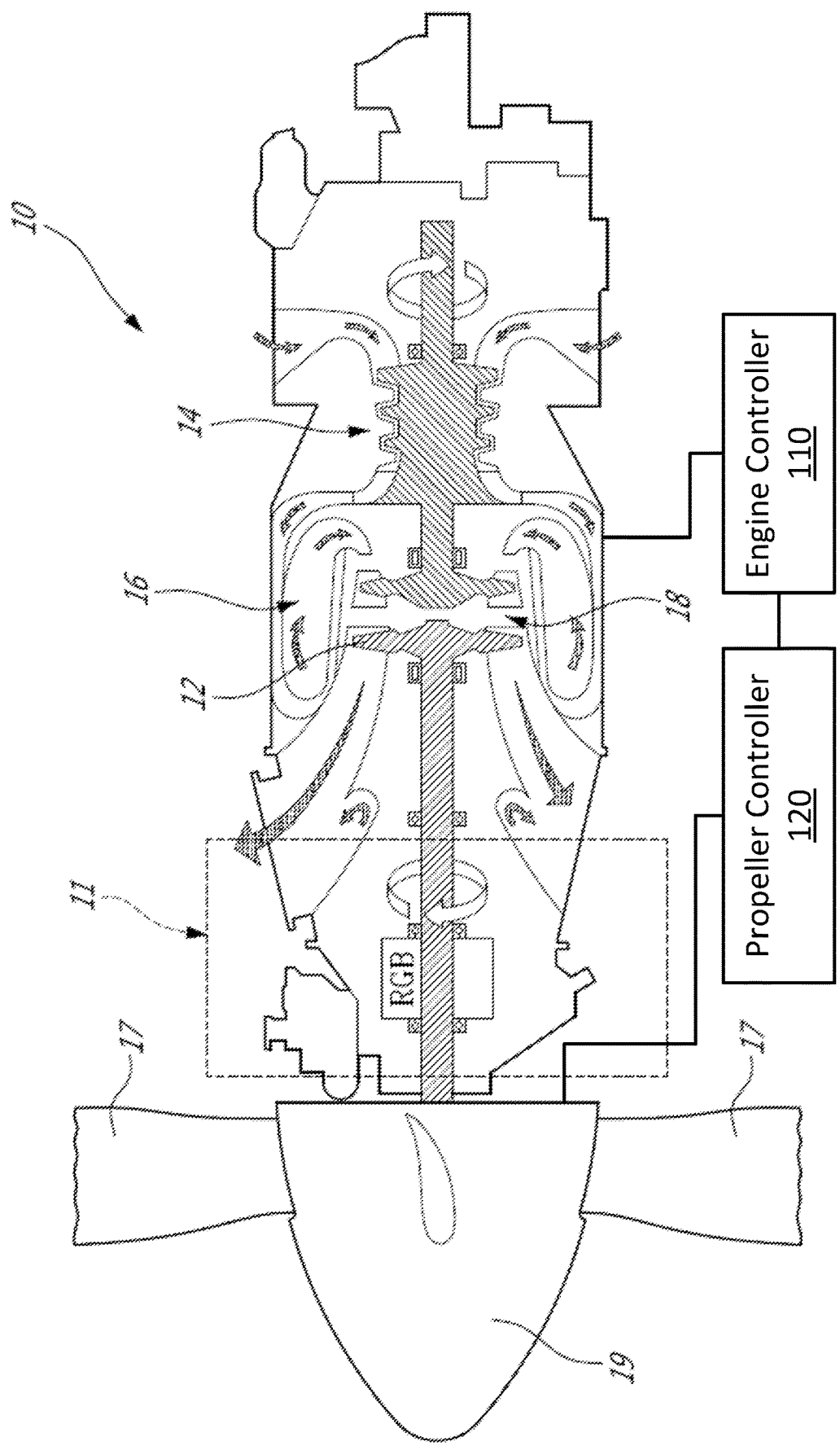
FIG. 1 is a schematic cross sectional view of an example aircraft engine.

FIG. 1 illustrates a gas turbine engine 10 of a type preferably provided for use in subsonic flight, generally comprising in serial flow communication a compressor section 14 for pressurizing ambient air, a combustor 16 in which the compressed air is mixed with fuel and ignited for generating an annular stream of hot combustion gases, and a turbine section 18 for extracting energy from the combustion gases. A low pressure (LP) turbine 12 drives, via a reduction gear box (RGB), a propeller 19 having propeller blades 17 for providing thrust to the aircraft. Although referred to herein as the propeller 19, it should be understood that the propeller 19 may be a broader propeller system, and may include various components related to the propeller itself, including components which assist in regulating the operation of the propeller 19. An oil system 11 is provided for the gas turbine engine 10, and provides lubrication for the rotating components of the gas turbine engine 10, which include bearings for the rotating turbomachinery (e.g. the compressors, turbines, shafts, and gears), the RGB and the propeller control systems, etc.

FIG. 1 illustrates the engine 10 as a gas turbine engine of an aircraft. It should, however, be understood that the engine 10 may include any other suitable type of engine comprising a propeller 19, such as a piston engine, a turboshaft engine, a rotary engine, for instance a Wankel engine, any other suitable type of combustion engine, and the like. In addition, although the various embodiments and examples provided in the present disclosure relate primarily to flight applications in which an engine (e.g., the engine 10) drives a propeller (e.g., the propeller 19), it should be understood that other fields of application, including in industrial settings, power generation settings (e.g. wind turbines), and the like, are also considered.

As illustrated in FIG. 1, an engine controller 110 is coupled to the engine 10 for controlling operation of the engine 10. Similarly, a propeller controller 120 is coupled to the propeller 19 for controlling operation of the propeller 19. The engine controller 110 and the propeller controller 120 may be communicatively coupled to one another via any suitable wired and/or wireless means, and may exchange signals, information, and the like to collaboratively operate the engine 10 and the propeller 19. In some embodiments, the engine controller 110 and the propeller 120 are communicatively coupled via one or more electrical, optical, and/or electromagnetic communication channels. In some other embodiments, the engine controller 110 and the propeller 120 may be communicatively coupled via one or more hydraulic and/or mechanical communication channels. In some further embodiments, the coupling between the engine controller 110 and the propeller 120 is effected by any suitable combination of the above. For example, one or more electrical wires, cables, or the like couple the engine controller 110 to the propeller controller 120. The operational control exerted by the engine controller 110 and the propeller controller 120 may include controlling the operation of the oil system 11.

Figure 2:
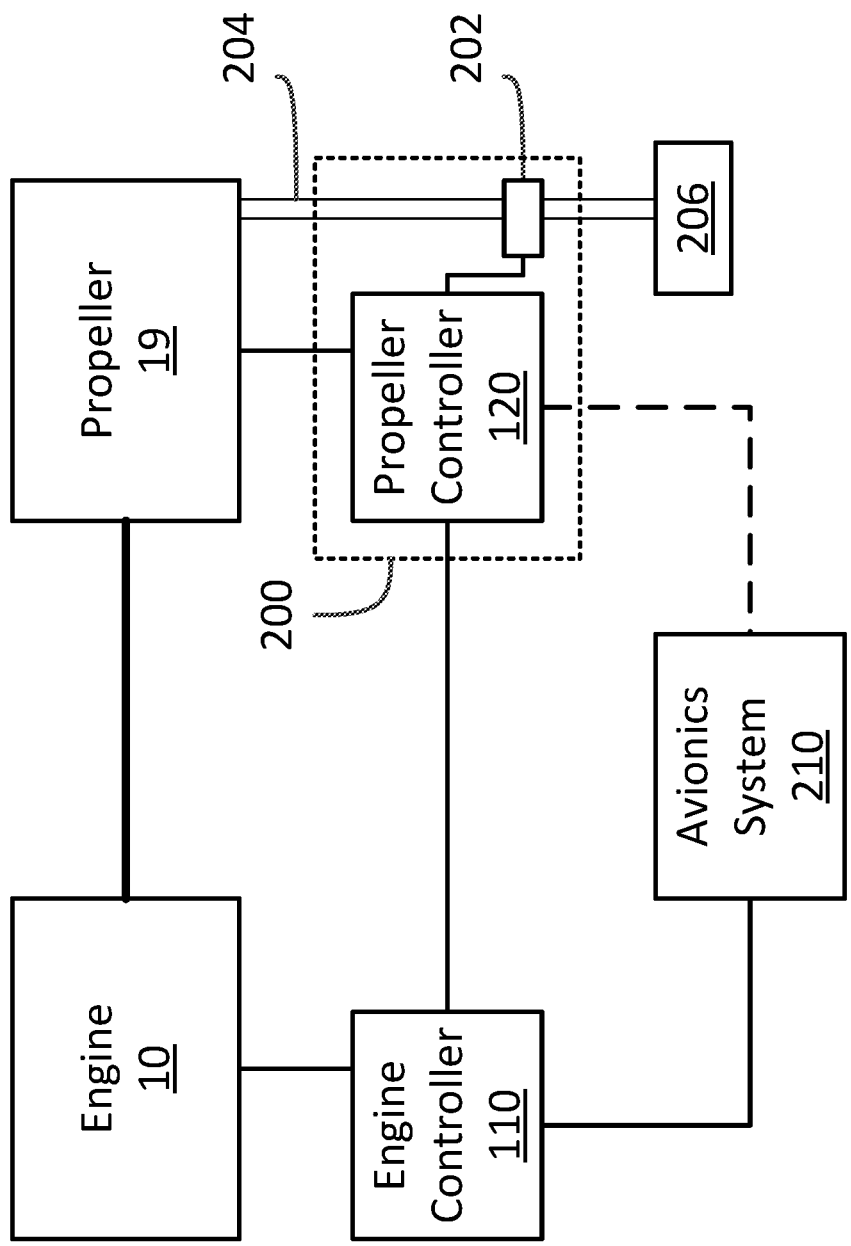
FIG. 2 is a block diagram representation of the aircraft engine of FIG. 1 and an example associated control system.

With reference to FIG. 2, a schematic representation of the engine 10 and the propeller 19 is illustrated. As noted hereinabove, the engine controller 110 and the propeller controller 120 are coupled to one another. In addition, the engine controller 110, and in some embodiments the propeller controller 120, may be connected to an external system, which may be an avionics system 210, in applications in which the engine 10 forms part of an aircraft, or a different external system in other applications.

The propeller controller 120 forms part of and assists in operating a propeller control unit (PCU), illustrated here at 200. The PCU 200 includes a valve 202 which is controlled by the propeller controller 120. In some embodiments, the valve 202 is an electrohydraulic servo valve (EHSV). The valve 202 modulates a flow of a fluid, for instance oil, which flows to the propeller 19 from a reservoir 206 via a conduit 204. Put differently, the valve 202 controls the rate at which oil flows from the reservoir 206 to the propeller 19. The flow of oil through the conduit 204 governs the operation of the propeller 19, including modifying the pitch angle of the propeller blades 17 (sometimes referred to as the beta angle) and the rotational speed of the propeller 19. The particular response of the propeller 19 to increasing or decreasing the oil flow to the propeller 19, by increasing or decreasing the degree to which the valve 202 is open (which increases or decreases the oil pressure delivered to the propeller 19), may vary from one application to the next. For example, increasing the oil flow to the propeller 19 causes the propeller blades 17 to transfer to a lower pitch angle, such that, when the propeller 19 is operating in a forward (i.e., positive) range of pitch angles, the propeller 19 experiences acceleration (i.e., an increase in rotational speed). By way of another example, decreasing the oil flow to the propeller 19 causes the propeller blades 17 to transfer to a higher pitch angle, so that, when the propeller 19 is operating in a forward (i.e., positive) range of pitch angles, the propeller 19 experiences deceleration (i.e., a decrease in rotational speed). Other examples and implementations are also considered.

In some cases, it may be desirable to validate whether the PCU 200 is functioning properly. In some cases, deterioration of the valve 202 may occur, which results in poor response times when a change in the pitch angle of the propeller blades 17 is commanded. In some other cases, the valve 202 may malfunction, for instance due to wear, contamination, the presence of debris, or the like, causing requests to change in the pitch angle of the propeller blades 17 to fail. Other issues resulting from faulty behaviour of the valve 202 include governing speed drift, propeller speed overshoots, and the like, which in turn can trigger accommodation systems of the aircraft. It should also be noted that the viscosity of the fluid (e.g. oil) which flows from the reservoir 206 to the propeller 19 may affect the overall response time of the PCU 200, independently from the operation of the valve 202. The present disclosure provides, inter alia, methods and systems for validating PCUs, including validating the response time and/or operation of the valve 202.

Validation of the PCU 200 may be performed at any suitable time, and at any suitable frequency. In some embodiments, the flight phases during which validation of the PCU 200 is performed, and frequency of validation, are selected to achieve a particular testing outcome. For example, validation of the PCU 200 is performed during a start sequence of the engine 10. In some cases, validation of the PCU 200 being performed during the start sequence may allow for verification of the functionality of the PCU 200 after exposure to various ambient and environmental conditions, which may affect the functionality of the PCU 200. For instance, the viscosity of the fluid flowing through the conduit 204 to the propeller 19 may vary due to ambient and environmental conditions. Additionally, operability of the valve 202, or other valves of the PCU 200, may be validated before a flight mission in situations in which the engine 10 and/or an associated aircraft have not been operated for a certain period of time. In some embodiments, the engine start sequence for the engine 10 is composed of a plurality of operations, including validation of the PCU 200, which are performed in a particular order following an engine start request from an operator of the engine 10 and/or of an aircraft of which the engine 10 forms part. Thus, validation of the PCU 200 may be performed in response to the operator issuing the engine start request, for example to the engine controller 110. Performing validation of the PCU 200 during the engine start sequence may serve to detect failure of the PCU 200 prior to a period of extended operation which would be hindered by malfunction of the PCU 200. By way of another example, validation of the PCU 200 is performed as part of a routine maintenance procedure. Other uses cases are also considered.

In some other embodiments, validation of the PCU 200 is performed in response to receiving a PCU validation request from the operator, which may be received, for instance, at the propeller controller 120. A manufacturer, designer, regulator, or other relevant authority may specify that PCU validation should be performed at certain predetermined engine parameters, and the operator of the engine 10 may be trained to request PCU validation only when the predetermined engine parameters are satisfied. For example, the engine parameters for PCU validation may specify a particular engine temperature, engine power output, engine speed (e.g., a rotational speed of an output shaft of the engine 10), propeller rotational speed, etc., or any suitable combination thereof. In some embodiments, the engine controller 110 may prompt the operator to perform the PCU validation when the engine controller 110 determines that the predetermined engine parameters are satisfied. For instance, the engine controller 110 may issue an alert to the operator via the avionics system 210, which may cause a message to appear on a display, a visual indicator to be illuminated or otherwise activated, or the like. The operator may then issue the request to perform the PCU validation, which is provided to the engine controller 110.

In some further embodiments, the engine controller 110 may be configured for automatically performing the PCU validation, for instance as part of the engine start sequence, after determining that the predetermined engine parameters are satisfied. For example, the engine controller 110 and/or the propeller controller 120 may be configured for maintaining the predetermined engine parameters for the duration of the PCU validation. In this example, the predetermined engine parameters may correspond to particular steady-state conditions for the engine 10 and/or for the propeller 19, which may be determined by the manufacturer, designer, regulator, or other relevant authority, for instance on the basis of analytical and/or experimental data.

Other approaches are also considered. By way of an example, validation of the PCU 200 in the context of a wind turbine (in which there is no engine 10) may be prompted, or automatically be performed, once the propeller 19 has been active for a predetermined amount of time, or when a temperature of the oil flowing through conduit 204 reaches a predetermined temperature.

In some embodiments, validation of the PCU 200 is performed by commanding the valve 202 to achieve a predetermined state, that is to say, a predetermined degree of openness or closedness. For example, the propeller controller 120 commands the valve 202 to achieve a state of being open to a maximum or minimum amount, to 90% of a maximum amount, 50% of a maximum amount, 25% of a maximum amount, or the like. The predetermined degree of openness or closedness may correspond to a predetermined position of the valve 202 which, when achieved, results in a predetermined oil pressure being delivered to the propeller 19, which in turn causes the blades 17 to achieve a commanded pitch angle. By way of another example, the propeller controller 120 commands the valve 202 to achieve the predetermined position of the valve 202 which, when achieved, results in the predetermined oil pressure causing the propeller 19 to achieve a commanded rotational speed (which may be associated with the commanded pitch angle, for instance based on the relationship between the rotational speed of the propeller 19 and the pitch angle of the blades 17). Validation of the PCU 200 is performed by comparing the actual pitch angle of the blades 17 to a pitch angle threshold and/or the actual rotational speed of the propeller 19 to a rotational speed threshold, as appropriate. The pitch angle threshold can be the commanded pitch angle, or a value based thereon; similarly, the rotational speed threshold, which may be determined by one or more known relationships between the pitch angle of the blades 17 and the rotational speed of the propeller 19, may be a commanded rotational speed (i.e., associated with the commanded pitch angle), or a value based thereon. It should be noted that the engine 10 may be operating in a steady-state while the validation of the PCU 200 is ongoing, or may be in transition from one state to another, for instance accelerating or decelerating in any suitable fashion.

The propeller controller 120 may issue the command as an analog signal, for instance a voltage level applied to the valve 202, or as a digital signal transmitted to a controller associated with the valve 202. The particular predetermined state which the propeller controller 120 commands for the valve 202 may be established by a manufacturer, designer, regulator, or other relevant authority. For instance, the manufacturer of the propeller 19 and/or of the engine 10 may establish the parameters by which the validation of the PCU 200 is performed, including the predetermined state commanded for the valve 202.

Commanding the valve 202 to achieve the predetermined state causes a change in the flow of fluid to the propeller 19, which in turn alters the pitch angle of the blades 17 of the propeller 19 (and, by extension, the rotational speed of the propeller 19). The expected time required for the valve 202 to achieve the predetermined state, and thus for the blades 17 to achieve an associated predetermined pitch angle, may be known. For instance, a manufacturer, designer, regulator, or other relevant authority, may perform various testing tasks to determine the expected time. The expected time for the blades 17 to achieve the predetermined pitch angle may be provided to the propeller controller 120 and/or to the engine controller 110, for instance being stored in a memory or other data repository.

After a predetermined time delay has elapsed—commensurate with the expected time required for the valve 202 to achieve the predetermined state—the actual pitch angle of the blades 17 and/or the actual rotational speed of the propeller 19 is determined. The engine 10 and the propeller 19 are provided with a sensing system capable of determining the pitch angle of the blades 17 and the rotational speed of the propeller 19. For instance, the sensing system makes use of a feedback ring which rotates with the propeller 19 and moves axially in response to changes in the pitch angle of the blades 17. The sensing system can be used to determine the actual pitch angle of the blades 17 and the actual rotational speed of the propeller 19.

The propeller controller 120 and/or the engine controller 110 may, after the time delay has elapsed, compare the actual pitch angle of the blades 17 to the pitch angle threshold, and/or compare the actual rotational speed of the propeller 19 to the rotational speed threshold. The pitch angle threshold and the rotational speed threshold are representative of expected values for the pitch angle of the blades 17 and the rotational speed of the propeller 19 when the valve 202 is in the predetermined state. When the actual pitch angle (and/or actual rotational speed) fails to meet the pitch angle threshold (and/or the rotational speed threshold), it can be concluded that the valve 202 did not reach the predetermined state, and thus that the PCU 200 is not operating as expected. Conversely, when the actual pitch angle (and/or actual rotational speed) meets the pitch angle threshold (and/or the rotational speed threshold), it can be concluded that the valve 202 did reach the predetermined state, and thus that the PCU 200 is operating as expected.

The comparison of the actual pitch angle to the pitch angle threshold may include comparing the actual pitch angle to the commanded pitch angle itself, to a value based thereon (e.g., 95% of the commanded pitch angle), a range of values including the commanded pitch angle, and the like. Similarly, the comparison of the actual rotational speed to the rotational speed threshold may include comparing the actual rotational speed to the commanded rotational speed itself, to a value based thereon (e.g., 95% of the commanded rotational speed), a range of values including the commanded rotational speed, and the like. It should be noted that the actual pitch angle may be considered to meet the pitch angle threshold when a difference between the actual pitch angle and the pitch angle threshold is below a predetermined amount, or when the actual pitch angle and the pitch angle threshold are within a particular range, or the like. Similarly, the actual rotational speed may be considered to meet the rotational speed threshold when a difference between the actual rotational speed and the rotational speed threshold is below a predetermined amount, or when the actual rotational speed and the rotational speed threshold are within a particular range, or the like. The comparison of the actual pitch angle of the blades 17 to the pitch angle threshold (and/or of the actual rotational speed of the propeller 19 to the rotational speed threshold) can be performed by the engine controller 110, the propeller controller 120, a unified controller which combines the functionality of the engine controller 110 and the propeller controller 120, or any other suitable control device, as appropriate.

When the comparison of the actual pitch angle (and/or actual rotational speed) to the pitch angle threshold (and/or rotational speed threshold) indicates that the PCU 200 is validated (i.e., that the response time of the valve 202 is adequate), the engine controller 110 and/or the propeller controller 120 can issue a signal indicating that the PCU 200 has been validated. The validation signal may be issued to the avionics system 210, which in turn may cause a message to appear on a display, a visual indicator to be illuminated or otherwise activated, or the like. The signal can indicate that the validation of the PCU 200 was successful, a response time of the valve 202, or any other suitable information. In some embodiments, a record of the validation may be stored, for instance in a database of any suitable type, along with relevant metadata or other information, as an indication that the PCU validation was performed and validated the PCU 200. In embodiments in which the PCU validation is performed as part of a start sequence for the engine 10 or another system of which the engine 10 is an element, the validation of the PCU 200 may be the trigger for continuing with the start sequence, or for operating the engine 10 (or the broader system) in a different operating regime. For example, validation of the PCU 200 may be a prerequisite for operating the engine 10 in a pre-takeoff or takeoff regime. The engine controller 110 may indicate to the operator that the engine 10 cannot be transitioned to the pre-takeoff or takeoff regime, for instance from a ground idle regime, until the PCU 200 is validated. Once the PCU 200 is validated and the avionics system 210 receives the relevant signal, the avionics system 210 may indicate to the operator that the engine 10 may be transitioned to the pre-takeoff or takeoff regime.

When the comparison of the actual pitch angle (and/or actual rotational speed) to the pitch angle threshold (and/or rotational speed threshold) indicates that the PCU 200 is not validated (i.e., that the response time of the valve 202 is not adequate), the engine controller 110, the propeller controller 120, and/or the avionics system 210 may, separately or collaboratively, enact one or more countermeasures to accommodate for the invalidated PCU 200. In some embodiments, the engine controller 110 and/or the propeller controller 120 issues a warning signal which indicates the failed validation of the PCU 200. The warning signal may be sent to an operator of the propeller 19 (and therefore of the engine 10). For example, in cases in which the engine 10 forms part of an aircraft, the warning signal may be sent to an operator of the aircraft, which may be a pilot, a maintenance worker, or the like, and may be communicated to the operator via the avionics system 210. For instance, the warning signal may be presented to the operator via a display, which may include one or more screens, one or more warning lights, one or more audio messages, or the like.

The warning signal may include various information for presentation to the operator. By way of an example, the warning signal may indicate that the PCU 200 was not validated by the validation procedure performed. By way of another example, the warning signal may indicate a degree of failure, that is to say, an indication of the difference between the actual pitch angle of the blades 17 (and/or actual rotational speed of the propeller 19) and the pitch angle threshold (and/or rotational speed threshold) after the predetermined time delay elapsed. For instance, the warning signal may indicate that the actual pitch angle reached only 50% of the pitch angle threshold. The degree of failure may be indicative of additional countermeasures which may be implemented manually by the operator.

By way of a further example, the warning signal may indicate whether or not failure of validation of the PCU 200 is likely to be remedied under different operating conditions for the propeller 19 and/or the engine 10. For instance, the response of the propeller 19 to the operation of the valve 202 may also be based on properties of the fluid flowing through the conduit 204, including the viscosity of the fluid. Thus, in some cases, the warning signal may indicate a likelihood of a subsequent validation of the PCU 200 succeeding, and/or a recommended operating time of the propeller 19 and/or the engine 10 prior to issuing the request to revalidate the PCU 200. In some embodiments, the avionics system 210 may prompt the operator to request that the subsequent validation of the PCU 200 be performed, or may automatically request the subsequent validation after the recommended operating time has elapsed.

In some embodiments, the warning signal being issued to the avionics system 210 causes the avionics system 210 to enact various countermeasures. As noted hereinabove, validation of the PCU 200 may be performed as part of a start sequence of the engine 10 and/or for the propeller 19. When the avionics system 210 obtains the warning signal, the avionics system 210 may prevent the engine 10 and/or the propeller 19 from operating in one or more operating regimes. For example, during the start sequence of the engine 10, the engine 10 is operated in an idle mode, a pre-takeoff mode, or the like. When the warning signal is received by the avionics system 210, the avionics system 210 may thereafter prevent the engine 10 from being operated in a different regime, such as a takeoff regime, or the like. Alternatively, or in addition, upon determining that the PCU 200 is not validated, the engine controller 110 and/or the propeller controller 120 can request that the avionics system 210 prevent the engine 10 from being operated in a different regime.

After determining that the PCU 200 is not validated, and after issuing the warning signal, in some embodiments attempts to subsequently validate the PCU 200 are performed. Subsequent attempts at validation of the PCU 200 may be performed in similar fashion to the initial PCU validation described hereinabove: subsequent actuation of the valve 202 is commanded, and a subsequent blade angle of the blades 17 (and/or a subsequent rotational speed of the propeller 19) is determined after the predetermined time delay has elapsed from the commanding of the subsequent actuation of the valve 202. The subsequent blade angle (and/or subsequent rotational speed) is compared to the blade angle threshold (and/or rotational speed threshold), and when the subsequent blade angle (and/or subsequent rotational speed) meets the blade angle threshold (and/or rotational speed threshold), the PCU 200 is validated. When the subsequent blade angle (and/or the subsequent rotational speed) fails to meet the blade angle threshold (and/or rotational speed threshold), a subsequent warning signal is issued to the operator, for instance via the avionics system 210. The blade angle threshold (and/or the rotational speed threshold) used as part of the subsequent validation attempt may be the same as the original blade angle threshold (and/or original rotational speed threshold), or may differ therefrom in any suitable fashion.

In some cases, multiple attempts to revalidate the PCU 200 are permissible, whereas in some other cases, validation of the PCU 200 may only be attempted a predetermined number of times. Attempts to revalidate the PCU 200 may be requested by the operator, for instance via the avionics system 210, which commands the engine controller 110 and/or the propeller controller 120 to attempt to revalidate the PCU 200, or may be performed automatically. By way of an example, in response to receiving the warning signal, the avionics system 210 may command the engine controller 110 and/or the propeller controller 120 to attempt to revalidate the PCU 200. The command may be sent a predetermined time delay after receiving the warning signal, or after a time delay included as part of the warning signal. By way of another example, upon determining that the PCU 200 is not validated, the engine controller 110 and/or the propeller controller 120 may attempt to revalidate the PCU 200 after issuing the warning signal. Other approaches are also considered.

When a subsequent validation attempt for the PCU 200 results in the PCU 200 being validated, the engine controller 110 and/or the propeller controller 120 may issue a signal, for instance to the avionics system 210, that the PCU 200 was subsequently validated. Subsequent validation attempts for the PCU 200 which result in failure to validate the PCU 200 lead to subsequent warning signals being issued. The subsequent warning signals may be substantially similar to the warning signal described hereinabove, or may be different in any suitable fashion. In some embodiments, when a final validation attempt for the PCU 200 fails, the subsequent warning signal may indicate that no further validation attempts are permitted. The subsequent validation signal(s) may also provide other information, such as a proposed maintenance action to be performed on the PCU 200 and/or the propeller 19 more generally.

In other embodiments, the PCU 200 may be validated using other approaches. For instance, after commanding the valve 202 to achieve a predetermined state, the engine controller 110 and/or the propeller controller 120 may continually monitor the actual pitch angle of the blades 17, and/or actual rotational speed of the propeller 19, until the pitch angle threshold (and/or rotational speed threshold) associated with the predetermined state of the valve 202 is achieved. The actual time delay required for the actual pitch angle of the blades 17 to reach the pitch angle threshold (and/or actual rotational speed of the propeller 19 to reach the rotational speed threshold) may be measured and compared to an expected time delay. When the engine controller 110 and/or the propeller controller 120 determine that the actual time delay is beyond the expected time delay (or beyond a value based on the expected time delay, outside of a range including the expected time delay, etc.), the warning signal can be issued to the operator to indicate that the PCU 200 is not operating as expected (i.e., that the response time of the valve 202 is slower than expected). Other approaches are also considered.

In some embodiments, the predetermined time delay is a fixed value which remains constant for all validations of the PCU 200. The predetermined time delay can be altered by a maintenance crew or other responsible entity, but otherwise remains constant, as established by the manufacturer, designer, regulator, or other relevant authority. In some other embodiments, the predetermined time delay may be periodically updated. By way of an example, the predetermined time delay may be updated over the lifespan of the valve 202 to account for expected wear and tear and degradation of the valve 202. The predetermined time delay could increase, for instance to allow for slower response times of the valve 202 as the valve 202 ages, but would nevertheless allow the engine controller 110 and/or the propeller controller 120 to detect failure or malfunction of the valve 202. By way of another example, the predetermined time delay may be periodically updated based on the result of the validations of the PCU 200. For instance, the predetermined time delay can be based on, or adjusted based on, an average response time for a previous number of validations, a rolling average response time for a previous number of validations, or the like. In this fashion, anticipated gradual deterioration of the valve 202 may be taken into account when validating the PCU 200, while allowing the engine controller 110 and/or the propeller controller 120 to detect failure or malfunction of the valve 202. Other approaches for modifying the predetermined time delay are also considered. In some cases, the evolution of the response time of the valve 202 may be tracked over time, and may be used to predict eventual failure of the valve 202 and/or to recommend preventative maintenance for the PCU 200.

Although the present disclosure focuses primarily on systems in which the PCU 200 controls operation of the propeller 19 via a hydraulic system, it should be understood that the techniques described herein may also be used to validate PCUs which operate on different principles. For instance, an alternative embodiment of the PCU 200 may control the operation of the propeller 19 via one or more electrical actuators, via one or more pneumatic actuators, or the like, and the methods and systems described herein may be used to validate the alternative embodiment of the PCU 200.

Figure 3:
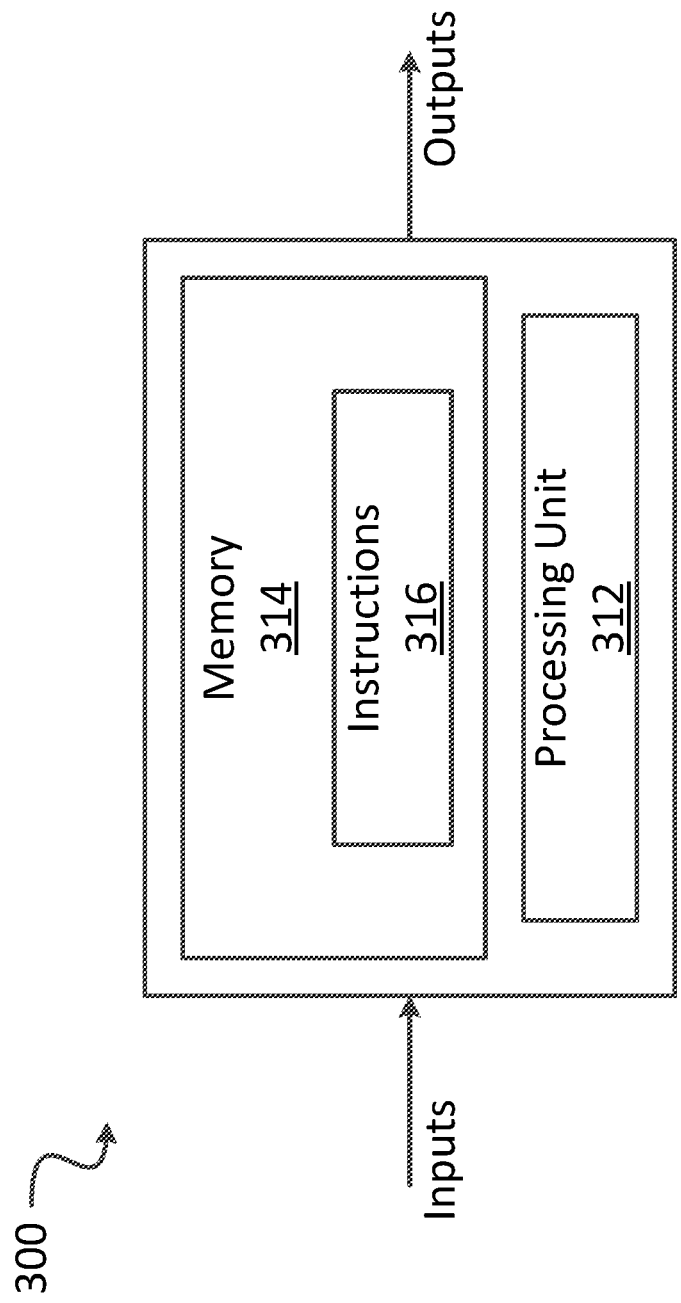
FIG. 3 is a block diagram of an example computing device.

With reference to FIG. 3, an example of a computing device 300 is illustrated. For simplicity, only one computing device 300 is shown; it should nevertheless be understood that multiple computing devices 300 operable to exchange data may be employed, as appropriate. The computing devices 300 may be the same or different types of devices. The engine controller 110, the propeller controller 120, and/or the avionics system 210 may be implemented, in whole or in part, using one or more computing devices 300. The engine controller 110 and/or the propeller controller 120 may be implemented as part of a full-authority digital engine controller (FADEC) or other similar device, including an electronic engine controller (EEC), engine control unit (ECU), propeller electronic controller (PEC), propeller control unit, and the like. In some embodiments, the engine controller 110 and/or the propeller controller 120 are implemented as a Flight Data Acquisition Storage and Transmission system, such as a FAST™ system. The engine controller 110 and/or the propeller controller 120 may be implemented in part in the FAST™ system and in part in the FADEC, EEC, or other similar device. The engine controller 110 and/or the propeller controller 120 may be implemented using physical controllers, distributed controllers, virtual controllers (i.e., implemented within one or more virtual machines), or any suitable combination thereof.

In some embodiments, the EEC, the PEC, and/or any other control devices may be operated or provided in a single-channel configuration, or may be operated or provided in a dual- or multiple-channel configuration. Depending on the configuration of the control device(s), validation of the PCU 200 may be performed via a single channel, or via multiple channels. For instance, a determination of failure of the PCU 200 based on a validation performed on a first channel may be confirmed via a similar determination performed on a second channel. Other embodiments may also apply.

The computing device 300 comprises a processing unit 312 and a memory 314 which has stored therein computer-executable instructions 316. The processing unit 312 may comprise any suitable devices configured to implement the functionality described herein, including the various methods described hereinbelow, such that instructions 316, when executed by the computing device 300 or other programmable apparatus, may cause the functions/acts/steps described herein to be executed. The processing unit 312 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 314 may comprise any suitable known or other machine-readable storage medium. The memory 314 may comprise non-transitory computer readable storage medium, for example, but not limited to, an electronic, magnetic, optical, electromagnetic, infrared, or semiconductor system, apparatus, or device, or any suitable combination of the foregoing. The memory 314 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

Figure 4:
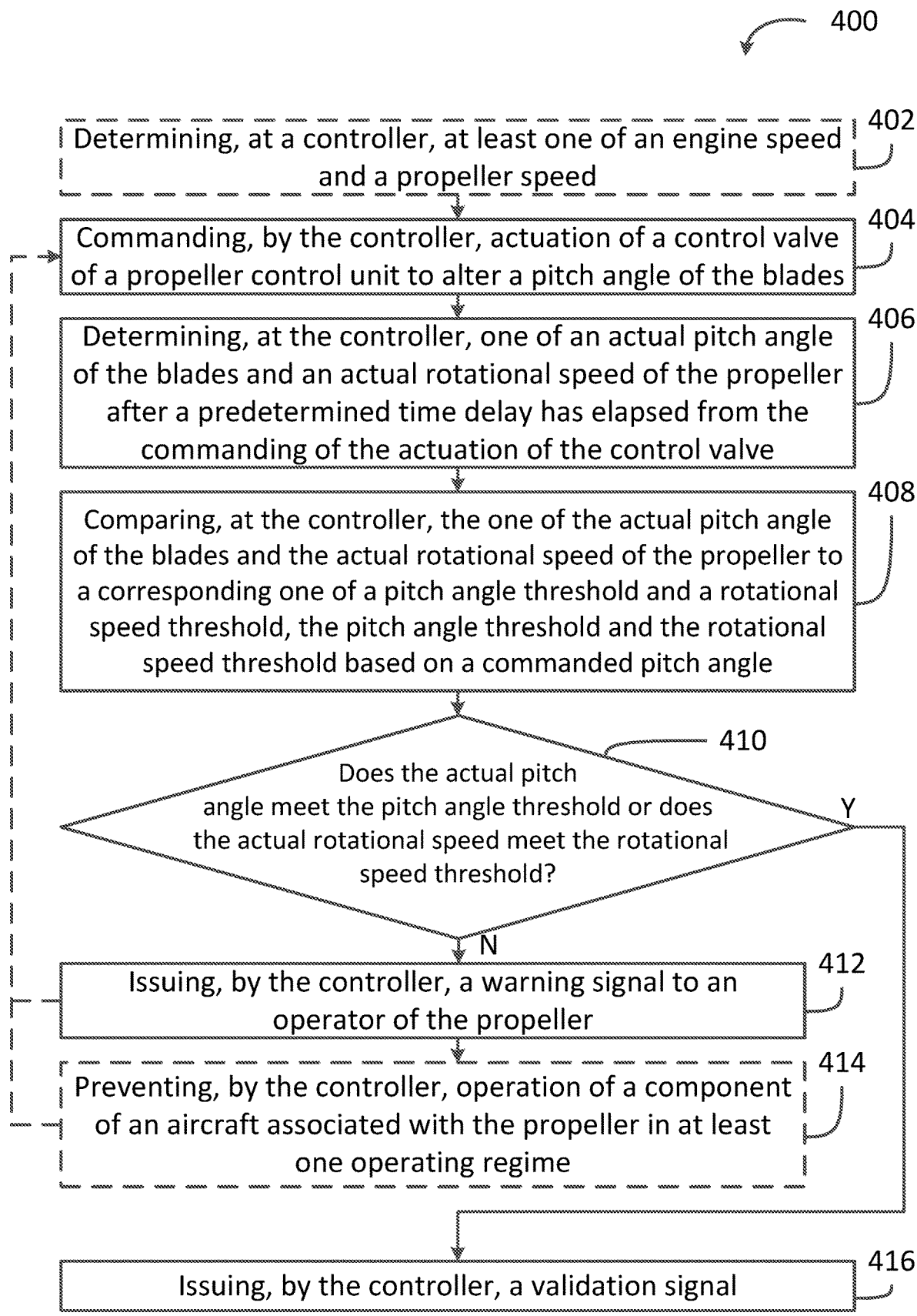
FIG. 4 is a flowchart illustrating an example method for validating a propeller control unit.

With reference to FIG. 4, there is illustrated a method 400 for validating a propeller control unit, for instance the PCU 200. The PCU 200 is associated with a propeller having blades, for instance the propeller 19 having blades 17, and in some case may form part of an engine, for instance the engine 10. In some other cases, the PCU 200 and the associated propeller may be associated with another system, for instance a wind turbine, or the like. In some embodiments, the method 400 is performed, in whole or in part, as part of a start sequence for the engine 10, or for another system of which the propeller 19 forms part. For example, a request to perform validation of the PCU 200 is obtained as part of an engine start sequence, following which one or more of the steps of the method 400 are performed. Part or all of the method 400 may be performed by the engine controller 110, the propeller controller 120, and/or the avionics system 210, which may collaborate to perform the steps of the method 400 in any suitable fashion. Reference in the following paragraphs to a "controller" may thus refer to any suitable combination of the engine controller 110, the propeller controller 120, and/or the avionics system 210.

At step 402, in some embodiments the method 400 comprises determining, at the controller, at least one of an engine speed of the engine 10 and a propeller speed of the propeller 19. In embodiments in which the propeller 19 associated with the PCU 200 forms part of an engine system, for instance the engine 10, the engine speed (e.g. the speed of the LP turbine 12) may be determined in addition to, or instead of, the propeller speed. In other embodiments, the propeller speed may be determined. The terms "propeller speed" and "engine speed" may refer to the rotational speed of one or more elements of the propeller 19 and engine 10, respectively.

At step 404, the method 400 comprises commanding, by the controller, actuation of a control valve of the propeller control unit, for instance the valve 202 of the PCU 200. The actuation of the valve 202 results in altering a pitch angle of the blades 17 of the propeller 19, which in turn may alter a rotational speed of the propeller 19. In some embodiments, the actuation of the valve 202 is performed in response to obtaining a request to perform validation of the PCU 200, for instance from an operator associated with the propeller 19 (e.g, an operator of the engine 10, or of another broader system of which the propeller 19 forms part). In some embodiments, actuation of the valve 202 is performed after detecting that the engine speed and/or the propeller speed, determined at step 402, are found to be above or at a particular speed threshold. For example, when performed as part of the start sequence for the engine 10, the method 400 step 404 is performed after detecting, at step 402, that the engine speed is above or at a speed threshold of the engine 10.

At step 406, the method 400 comprises determining, at the controller, one of an actual pitch angle of the blades 17 and an actual rotational speed of the propeller 19 after a predetermined time delay has elapsed from the commanding of the actuation of the control valve 202. The predetermined time delay may be based on an expected delay required for the valve 202 to reach a particular state, resulting in the pitch angle of the blades 17 reaching a pitch angle threshold, or in the rotational speed of the propeller 19 reaching a rotational speed threshold, based on the commanding performed at step 404. The predetermined time delay may be established by a manufacturer, designer, regulator, or other relevant authority. The actual pitch angle of the blades 17 and the actual rotational speed of the propeller 19 can be determined in any suitable fashion, for instance using a feedback system which employs a feedback device which rotates with the propeller 19 and moves axially in response to changes in the pitch angle of the blades 17.

At step 408, the method 400 comprises comparing, at the controller, the one of the actual pitch angle of the blades and the actual rotational speed of the propeller to a corresponding one of the pitch angle threshold and the rotational speed threshold (the rotational speed threshold associated with the pitch angle threshold). The actuation of the valve 202 at step 404 commands the valve 202 to achieve a particular state (i.e., a degree of openness or closedness), which in turn corresponds to a commanded pitch angle for the blades 17, on which the pitch angle threshold is based, and an associated commanded rotational speed of the propeller 19, on which the rotational speed threshold is based. The comparison of the actual pitch angle to the pitch angle threshold may be made between the actual pitch angle and the commanded pitch angle, with a value based on the commanded pitch angle, with a range of values including the commanded pitch angle, or the like (or for similar combinations involving the actual rotational speed and the rotational speed threshold). The comparison between the actual pitch angle or the actual rotational speed and the pitch angle threshold or the rotational speed threshold may be performed in any suitable fashion.

At decision step 410, a determination is made regarding whether the actual pitch angle meets the pitch angle threshold, or whether the actual rotational speed meets the rotational speed threshold. Step 410 may include determining whether the actual pitch angle meets the commanded pitch angle, a value based thereon, a range of values including the commanded pitch angle, or the like. Step 410 may also include determining whether the actual rotational speed meets the commanded rotational speed, a value based thereon, a range of values including the commanded rotational speed, or the like. In response to determining that the actual pitch angle (and/or actual rotational speed) fails to meet the pitch angle threshold (and/or rotational speed threshold), the method 400 moves to step 412. In response to determining that the actual pitch angle (and/or actual rotational speed) does meet the pitch angle threshold (and/or rotational speed threshold), the method 400 moves to step 416.

At step 412, the method 400 comprises issuing, by the controller, a warning signal to the operator of the propeller 19. The warning signal may include an indication that the PCU 200 was not validated, of a degree of failure of the PCU 200, of a recommended time delay before attempting revalidation of the PCU 200, or any other suitable information. The warning signal may be presented to the operator via a display, which may include a screen, a warning light, an audio device, or the like, and which may form part of the avionics system 210. In some embodiments, at step 414, the method 400 comprises preventing operation of a system associated with the propeller 19 in at least one operating regime. In embodiments in which the propeller 19 is part of the engine 10 and/or of a larger system, such as an aircraft, step 414 may include preventing a component of the aircraft from operating in a different operating regime, for instance preventing the engine 10 from entering a takeoff operating regime, or the like.

In response to determining that the actual pitch angle (and/or actual rotational speed) does meet the pitch angle threshold (and/or rotational speed threshold), the method 400 moves to step 416. It should be noted that meeting the pitch angle threshold (and/or rotational speed threshold) may also includes surpassing the pitch angle threshold (and/or rotational speed threshold) or being sufficiently similar to pitch angle threshold (and/or rotational speed threshold). At step 416, the method 400 comprises issuing, by the controller, a validation signal to the operator. The validation may be presented to the operator via a display, which may include a screen, a warning light, an audio device, or the like, and may include any information which may be relevant for the operator.

In some embodiments, subsequent attempts to validate the PCU 200 may be performed, for instance by repeating one or more of the steps of the method 400. The method 400 may thus return to a previous step, for instance step 404, from step 412 or step 414. A subsequent actuation of the valve 202 is commanded and a subsequent pitch angle of the blades 17 (and/or subsequent rotational speed of the propeller 19) is determined. The subsequent blade angle (and/or subsequent rotational speed) is compared to the pitch angle threshold (and/or rotational speed threshold) to determine whether the PCU 200 is validated. When the subsequent blade angle (and/or subsequent rotational speed) fails to meet the pitch angle threshold (and/or rotational speed threshold), a subsequent warning signal may be issued, which may, for instance, include a recommended maintenance action for the PCU 200. When the subsequent blade angle (and/or subsequent rotational speed) does meet the pitch angle threshold (and/or rotational speed threshold), the PCU 200 is validated, and a validation signal is issued, for instance for presentation to the operator.

The methods and systems for validating a propeller control unit described herein may be implemented in a high level procedural or object oriented programming or scripting language, or a combination thereof, to communicate with or assist in the operation of a computer system, for example the computing device 300. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 312 of the computing device 300, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, validation of the PCU 200 when part of a wind turbine may be performed during an initialization sequence or similar start sequence, for instance in response to detecting an ambient wind speed above a predetermined threshold. Yet further modifications could be implemented by a person of ordinary skill in the art in view of the present disclosure, which modifications would be within the scope of the present technology.

The invention claimed is:

1. A method for validating a propeller control unit associated with a propeller having blades, the method comprising:
  obtaining a request to perform a start sequence for an engine associated with the propeller;
  determining at least one of an engine speed of the engine and a rotational speed of the propeller;
  in response to the obtaining of the request to perform the start sequence and in response to the determining that at least one of the engine speed and the rotational speed of the propeller is above a speed threshold during the start sequence, commanding, by a controller, actuation of a control valve of the propeller control unit to alter a pitch angle of the blades to a commanded pitch angle and to control the rotational speed of the propeller to a commanded rotational speed;
  determining, at the controller, one of an actual pitch angle of the blades and an actual rotational speed of the propeller after a predetermined time delay has elapsed from the commanding of the actuation of the control valve;
  comparing, at the controller, the one of the actual pitch angle of the blades and the actual rotational speed of the propeller to a corresponding one of a pitch angle threshold and a rotational speed threshold, the pitch angle threshold and the rotational speed threshold based on the commanded pitch angle; and
  issuing, by the controller, a warning signal in response to determining one of the actual pitch angle failing to meet the pitch angle threshold and the actual rotational speed failing to meet the rotational speed threshold.

2. The method of claim 1, wherein the comparing of the one of the actual pitch angle of the blades and the actual rotational speed of the propeller to the corresponding one of the pitch angle threshold and the rotational speed threshold comprises comparing the actual pitch angle of the blades to one of the commanded pitch angle, a value based on the commanded pitch angle, and a range of values based on the commanded pitch angle.

3. The method of claim 1, wherein the comparing of the one of the actual pitch angle of the blades and the actual rotational speed of the propeller to the corresponding one of the pitch angle threshold and the rotational speed threshold comprises comparing the actual rotational speed of the propeller to one of the commanded rotational speed based on the commanded pitch angle, a value based on the commanded rotational speed, and a range of values based on the commanded rotational speed.

4. The method of claim 1, comprising:
  obtaining, at the controller and subsequent to the issuing of the warning signal, a request to revalidate the propeller control unit;
  in response to the obtaining of the request to revalidate the propeller control unit, commanding, by the controller, a subsequent actuation of the control valve to alter the pitch angle of the blades;
  determining, at the controller, one of a subsequent pitch angle of the blades and a subsequent rotational speed of the propeller after the predetermined time delay has elapsed from the commanding of the subsequent actuation of the control valve;
  comparing, at the controller, the one of the subsequent pitch angle of the blades and the subsequent rotational speed of the propeller to the corresponding one of the pitch angle threshold and the rotational speed threshold; and
  issuing, by the controller, a subsequent warning signal in response to determining one of the subsequent pitch angle failing to meet the pitch angle threshold and the subsequent rotational speed failing to meet the rotational speed threshold.

5. The method of claim 4, comprising issuing, by the controller, a validation signal in response to determining one of the subsequent pitch angle meeting the pitch angle threshold and the subsequent rotational speed meeting the rotational speed threshold.

6. The method of claim 4, wherein the issuing of the warning signal comprises providing an indication of a recommended operating time of the propeller prior to issuing the request to revalidate the propeller control unit.

7. The method of claim 4, wherein the issuing of the subsequent warning signal comprises providing an indication of a maintenance action to be performed on the propeller control unit.

8. The method of claim 1, comprising preventing, by the controller, operation of a component of an aircraft associated with the propeller in at least one operating regime in response to the determining of the one of the actual pitch angle failing to meet the pitch angle threshold and the actual rotational speed failing to meet the rotational speed threshold.

9. The method of claim 8, wherein the preventing of the operation of the component of the aircraft associated with the propeller in the at least one operating regime comprises preventing operation of an engine of the aircraft in the at least one operating regime.

10. The method of claim 1, comprising issuing, by the controller, a validation signal in response to determining one of the actual pitch angle meeting the pitch angle threshold and the actual rotational speed meeting the rotational speed threshold.

11. A system for validating a propeller control unit associated with a propeller having blades, the system comprising:
  a processing unit; and
  a non-transitory computer-readable medium having stored thereon instructions executable by the processing unit to cause the system to perform:
    obtaining a request to perform a start sequence for an engine associated with the propeller;
    determining at least one of an engine speed of the engine and a rotational speed of the propeller;
    in response to the obtaining of the request to perform the start sequence and in response to the determining that at least one of the engine speed and the rotational speed of the propeller is above a speed threshold during the start sequence, commanding actuation of a control valve of the propeller control unit to alter a pitch angle of the blades to a commanded pitch angle and to control the rotational speed of the propeller to a commanded rotational speed;
    determining one of an actual pitch angle of the blades and an actual rotational speed of the propeller after a predetermined time delay has elapsed from the commanding of the actuation of the control valve;

comparing the one of the actual pitch angle of the blades and the actual rotational speed of the propeller to a corresponding one of a pitch angle threshold and a rotational speed threshold, the pitch angle threshold and the rotational speed threshold based on the commanded pitch angle; and issuing a warning signal in response to determining one of the actual pitch angle failing to meet the pitch angle threshold and the actual rotational speed failing to meet the rotational speed threshold.

12. The system of claim 11, wherein the comparing of the one of the actual pitch angle of the blades and the actual rotational speed of the propeller to the corresponding one of the pitch angle threshold and the rotational speed threshold comprises comparing the actual pitch angle of the blades to one of the commanded pitch angle, a value based on the commanded pitch angle, and a range of values based on the commanded pitch angle.

13. The system of claim 11, wherein the comparing of the one of the actual pitch angle of the blades and the actual rotational speed of the propeller to the corresponding one of the pitch angle threshold and the rotational speed threshold comprises comparing the actual rotational speed of the propeller to one of the commanded rotational speed based on the commanded pitch angle, a value based on the commanded rotational speed, and a range of values based on the commanded rotational speed.

14. The system of claim 11, wherein the instructions are executable for:

obtaining, subsequent to the issuing of the warning signal, a request to revalidate the propeller control unit;

in response to the obtaining of the request to revalidate the propeller control unit, commanding a subsequent actuation of the control valve to alter the pitch angle of the blades;

determining one of a subsequent pitch angle of the blades and a subsequent rotational speed of the propeller after the predetermined time delay has elapsed from the commanding of the subsequent actuation of the control valve;

comparing the one of the subsequent pitch angle of the blades and the subsequent rotational speed of the propeller to the corresponding one of the pitch angle threshold and the rotational speed threshold; and issuing a subsequent warning signal in response to determining one of the subsequent pitch angle failing to meet the pitch angle threshold and the subsequent rotational speed failing to meet the rotational speed threshold.

15. The system of claim 11, wherein the instructions are executable for preventing operation of a component of an aircraft associated with the propeller in at least one operating regime in response to the determining of the one of the actual pitch angle failing to meet the pitch angle threshold and the actual rotational speed failing to meet the rotational speed threshold.

16. The system of claim 11, wherein the instructions are executable for issuing a validation signal in response to determining one of the actual pitch angle meeting the pitch angle threshold and the actual rotational speed meeting the rotational speed threshold.

* * * * *